United States Patent [19]

Kane

[11] 4,232,975
[45] Nov. 11, 1980

[54] PRINT HAMMER CONTROL
[75] Inventor: Milburn H. Kane, Round Rock, Tex.
[73] Assignee: International Business Machines Corporation, Armonk, N.Y.
[21] Appl. No.: 42
[22] Filed: Jan. 2, 1979
[51] Int. Cl.³ .............................................. B41J 1/26
[52] U.S. Cl. .............................. 400/144.2; 400/157.3; 400/322; 400/903
[58] Field of Search ............... 400/144.1, 144.2, 144.3, 400/320, 322, 328, 903, 157.3, 166; 101/93.19

[56] References Cited
U.S. PATENT DOCUMENTS

| | | | |
|---|---|---|---|
| 3,858,509 | 1/1975 | Grundherr | 101/93.19 |
| 4,030,591 | 6/1977 | Martin et al. | 400/144.2 |
| 4,134,692 | 1/1979 | Suzuki et al. | 400/144.2 |

Primary Examiner—Paul T. Sewell
Attorney, Agent, or Firm—James H. Barksdale, Jr.

[57] ABSTRACT

A method of, and a system for, controlling a constant current hammer in a carrier type daisy wheel printer. A logic table is utilized and first addressed with a carrier velocity code corresponding to character selection time. The table output is a sync point for determining hammer turn on time. The table is next addressed with a combination code made up of the velocity code and a code corresponding to the desired impact force. The table output this time is the actual turn on time for the hammer from the sync point. The on time of the hammer is then controlled by the desired impact force code. This code is also utilized to control the beginning of selection for the next character.

8 Claims, 10 Drawing Figures

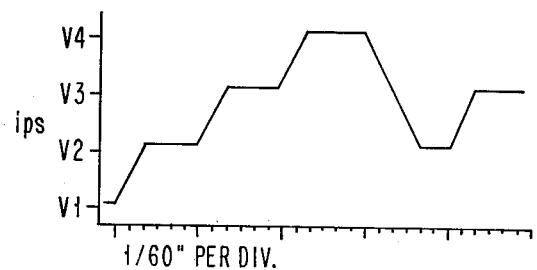
VELOCITY DISPLACEMENT PROFILE
FIG. 4
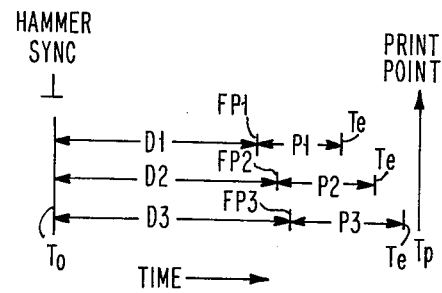
EXAMPLE OF DELAYS FOR ONE VELOCITY (V1)
FIG. 5
ROM MEMORY
| ROM ADD | ROM ADDRESS GENERATION LOGIC | | | | | | DATA OUT 8 BITS |
|---|---|---|---|---|---|---|---|
| 1 | HCL1 | HCL2 | HCL3 | V1 | ① | ① | SYNC 1 |
| 2 | | | | V2 | | | SYNC 2 |
| 3 | | | | V3 | | | SYNC 3 |
| 4 | | | | V4 | | | SYNC 4 |
| 5 | HCL1 | | | V1 | I1 | Ī2 | DELAY 1 |
| 6 | | | | V2 | | | |
| 7 | | | | V3 | | | |
| 8 | | | | V4 | | | |
| 9 | | | | V1 | Ī1 | I2 | |
| 10 | | | | V2 | | | |
| 11 | | | | V3 | | | |
| 12 | | | | V4 | | | |
| 13 | | | | V1 | I1 | I2 | |
| 14 | | | | V2 | | | |
| 15 | | | | V3 | | | |
| 16 | | | | V4 | | | DELAY 16 |
| 17 | ① | HCL2 | | ① | I1 | Ī2 | HAMMER LO |
| 18 | | | | | Ī1 | I2 | HAMMER MED |
| 19 | | | | | I1 | I2 | HAMMER HI |
| 20 | | | HCL3 | | I1 | Ī2 | INTERLOCK LO |
| 21 | | | | | Ī1 | I2 | INTERLOCK MED |
| 22 | | | | | I1 | I2 | INTERLOCK HI |
NOTE ① = IMMATERIAL
FIG. 6

PRINT HAMMER CONTROL

DESCRIPTION

CROSS-REFERENCE TO RELATED APPLICATION

U.S. patent application Ser. No. 863,450 now U.S. Pat. No. 4,189,246, filed Dec. 22, 1977, entitled "Variable Print-Hammer Control For On-The-Fly Printing," and having N. F. Barrow et al. as inventors.

BACKGROUND OF THE INVENTION

1. Field of the Invention

This invention is primarily related to carrier type daisy wheel print element printers wherein the carrier is escaped at varying velocities during printing and the print element is rotated in a start-stop mode for character selection. More specifically, this invention relates to determining and controlling the turn on time, and on time, of a print hammer which is to impact the print element during carrier escapement.

2. Description of the Priot Art

Printers which utilize a carrier carrying a rotatable daisy wheel print element are well known. Several such printers are commercially available. These printers can be classified by either focusing on print element rotation for character selection or by focusing on carrier escapement.

Focusing on print element rotation, such printers can be further divided into a first category where the print element is continually rotated and into a second category where the print element rotation is intermittent. In printers with a continually rotating print element, printing takes place when the hammer strikes the rotating print element. In printers wherein the print element intermittently rotates, the print element is rotated from rest until a desired character is aligned for printing and then rotation is stopped. No rotation occurs during actual printing.

Focusing on carrier escapement, some printers cause the carrier to stop each time printing is to occur. In other printers the carrier is moving at the instant printing occurs, and thus printing occurs on-the-fly. In both the type where the carrier is moving when printing occurs and in the type where the carrier is stopped when printing occurs, the print element may or may not be rotating at the time of printing. In some printers where the carrier is moving at a constant velocity when printing takes place, the carrier is accelerated, decelerated, or stopped between print positions along a print line on the paper being printed. This varying motion of the carrier is to accommodate selection time. That is, escapement of the carrier between print positions must be synchronized with the time required to rotate the print element to position a desired character relative to the hammer for printing on the paper. From the above, numerous combinations of carrier escapement and character selection are available.

Representative of the closest known prior art are U.S. Pat. Nos. 3,858,509 and 4,030,591 and the above cross-referenced application.

In U.S. Pat. No. 4,030,591, a number of issued and pending patents are discussed which relates generally to printers of the type mentioned above. As pointed out in this discussion, none of the references show a printer where the carrier is moving at a plurality of different velocities when printing occurs and where the firing of the print hammer is timed dependent upon the velocity of the carrier. This specific feature, which permits increased printing speed or throughput, is found in U.S. Pat. No. 4,030,591, and is also one of the features of the instant application. However, the apparatus in U.S. Pat. No. 4,030,591 does not incorporate means for varying the impact force of the print hammer with the print element in order to achieve high print quality.

In U.S. Pat. No. 3,858,509, a display wheel printer is disclosed in which the hammer impact force can be varied between "light" and "hard." However, printing does not occur on-the-fly, and therefore, there is no need to coordinate the velocity of the carrier with actuation of the print hammer.

U.S. patent application Ser. No. 863,450 now U.S. Pat. No. 4,189,246 discloses a carrier type daisy wheel printer wherein the carrier is moving and the print element is stopped during printing. The velocity of carrier escapement is variable, and the hammer impact force is varied according to the specific character to be printed. That is, printing occurs with the carrier escaping at one of a number of constant velocities which is dependent upon the selection time of the print element. The hammer impact force for printing is varied dependent upon the character to be printed. The time of firing is dependent upon the character to be printed and the velocity of the carrier. This referenced application and U.S. Pat. No. 4,030,591 disclose operation of a daisy wheel printer in a manner particularly suitable to the hammer control of the instant application.

SUMMARY OF THE INVENTION

Both a method of, and a system for, controlling a constant current print hammer are provided for a carrier type daisy wheel printer. With the carrier escaping and rotation of the print element to be stopped following character selection for printing, the turn on time of the hammer is dependent upon the character selection time and the on time of the hammer will determine impact force for impression control. A logid table is utilized which is selectively and sequentially addressed. That is, selection time is converted to a carrier velocity address code and the output of the table is a sync point for ultimately determining hammer turn on time. The sync point is variable, has no relationship to whether the print element has stopped, and corresponds to the carrier position in escapement units from the print point on a paper to be printed. The velocity address corresponds to the velocity of the carrier at the time a character will be in a position for printing. The table is then again addressed. This time the address is made up of the velocity code and the desired impact force which is converted to an impact code. The output of the table is the actual turn on time for the hammer from the sync point. The on time of the hammer is then determined by the impact code. The impact code is also utilized to determine when selection for the next character can begin.

BRIEF DESCRIPTION OF THE DRAWING

Referring now to the drawing, wherein a preferred embodiment of this invention is illustrated, and wherein like reference numerals are used throughout to designate like parts;

FIG. 4 is a graph illustrating acceleration and deceleration of the carrier in moving through succeeding print positions where carrier velocity is constant.

FIG. 5 is a diagram illustrating the duration of certain delay periods and the print hammer control pulse widths utilized in this invention to control the print hammer.

FIG. 6 is a chart showing address terms applied to a read only memory and corresponding outputs from the read only memory.

DESCRIPTION OF THE PREFERRED EMBODIMENT

Figure 1:
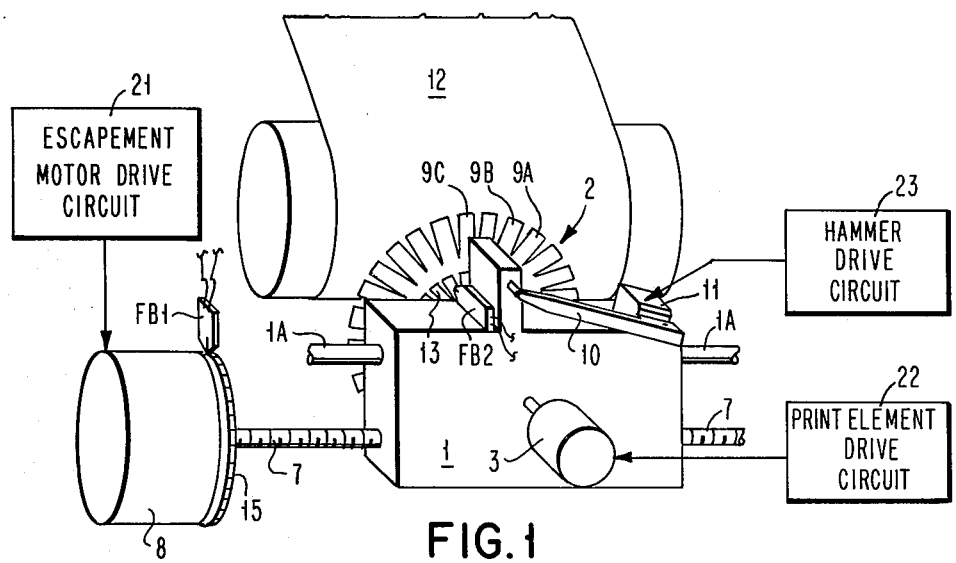
FIG. 1 shows a carrier type daisy wheel printer which is to be controlled according to the present invention.

FIG. 1 schematically illustrates those components of a carrier type daisy wheel printer of interest of this invention. Each of these components is well known and this is the reason for the schematic illustration. Of particular interest are the print hammer and hammer drive circuit, and the control thereof.

As shown in FIG. 1, a laterally movable carrier 1 is mounted on a guide rod 1a and a lead screw 7. Carrier 1 carries a rotatable print element 2 driven by a stepper motor 3. Carrier 1 is driven by lead screw 7 which is driven by a stepper motor 8.

Print element 2 is made up of a disc shaped central hub having a number of radially extending character petals 9A, 9B, 9C, etc, connected thereto. Printing of any desired character is brought about by operating a print hammer 10, which is actuated by a solenoid 11. Both hammer 10 and solenoid 11 are mounted on carrier 1. As a selected character petal approaches a printing position opposite print hammer 10 during rotation of element 2, solenoid 11 is activated to drive hammer 10 toward the selected character petal. The time of activation of solenoid 11 will be referred to later herein as hammer turn on time. A constant current is applied to solenoid 11 of a sufficient duration to cause hammer 10 to impact the selected petal to cause printing on paper 12. The current duration controls impression in terms of lightness or darkness of printing, and will be referred to later herein as hammer on time. An emitter wheel 13 attached to and rotating with print element 2 cooperates with a magnetic sensor FB2 to produce a stream of emitter index pulses for controlling the operation of the printer. The emitter has a series of teeth each of which correspond to one character petal 9A, 9B, 9C, etc. A homing pulse is generated for each revolution of print element 2 by a single tooth on another emitter (not shown). Thus, the angular position of print element 2 can be determined at any time by counting the pulses received since the last homing pulse. A toothed emitter 15 is mounted on the shaft of motor 8 and in conjunction with a transducer FB1 provides pulses which indicate the position of carrier 1.

Stepper motors 3 and 8 are activated by conventional drive circuits 21 and 22. Examples of the type of drive circuitry that could be used are shown in U.S. Pat. No. 3,636,429. Hammer solenoid 11 is actuated by a hammer drive circuit 23 which is also conventional.

The positioning of carrier 1 and print element 2 must be coordinated to accommodate required hammer turn on, and on time, to obtain proper character placement and impression on paper 12. Stated in another manner, the printing velocity at which carrier 1 is to be driven is dependent on the time required to rotate element 2 for character selection. In turn, the hammer turn on time is dependent upon both carrier velocity and selection time. Both print element 2 and carrier 1 must be in a proper position whether moving or not when hammer 10 strikes print element 2.

Figure 2:
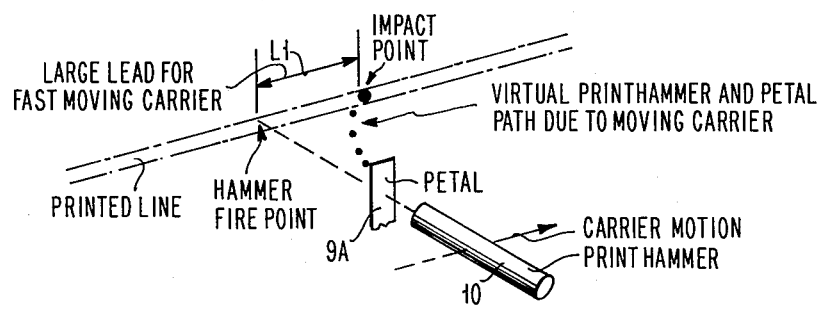
FIG. 2 is a diagrammatic view illustrating the relationship between the hammer firing point and the impact point when the carrier is moving at a relatively high velocity.
Figure 3:
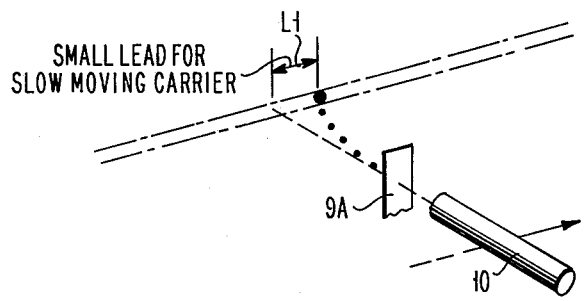
FIG. 3 is a view similar to FIG. 2 except that the carrier is moving at a relatively slow velocity.

Referring now to FIGS. 2 and 3, the relationship between the hammer firing point, or turn on time, and the impact point on paper 12 is illustrated. In FIG. 2 this relationship is illustrated with carrier 1 escaping at a relatively high velocity. In FIG. 3 the same relationship is illustrated with carrier 1 escaping at a slower velocity. As illustrated in FIG. 2, a relatively early hammer turn on time indicated by the long arrowed line L1 is required for petal 9A to imprint at a proper position on paper 12. In FIG. 3, the line L1 is relatively shorter. Thus, it is apparent that when the velocity of carrier 1 is changed, the hammer turn on time must be changed. Up to now in discussing FIGS. 2 and 3, it has been assumed that the flight time of print hammer 10 is constant. In actuality this is not the case. Although a constant current hammer is being considered, the flight time varies dependent upon the on time of the hammer. As long as current is applied to solenoid 11, hammer 10 will continue to accelerate. With this being the case, there can be later turn on times for longer on times. Therefore, L1 in FIG. 2 may be shorter than illustrated for a character requiring a high impact force to obtain a desired impression. Likewise, L1 in FIG. 3 may be longer than illustrated for a character requiring a low impact force to obtain a desired impression.

As set out in U.S. Pat. No. 4,030,591, and the above cross-referenced application, carrier 10 can be escaped at a plurality of different velocities depending upon the time required to rotate print element 2 for character selection. Four different velocities are utilized in the cross-referenced application for the carrier. For purposes of illustrating the instant invention, the movement of carrier 1 will likewise be at a velocity chosen from among four different velocities V1, V2, V3, and V4. It is assumed that velocity V1 will be the lower of the velocities, velocity V2 higher than V1, velocity V3 higher than V2 and V1, and velocity V4 the highest velocity. By selecting the highest velocity at which carrier 1 can move for any selected change in rotational position of print element 2, the printing speed of the printer can be maximized. With the above in mind, the subject of this invention is controlling hammer turn on, and on time, relative to a selected carrier velocity in order to insure that a character is printed at a proper location with a desired impression on paper 12.

As previously noted relative to U.S. Pat. No. 4,030,591, in the case where the impact force of print hammer 10 on a petal is constant, it is only necessary to coordinate hammer turn on time with carrier velocity to obtain desirable printing results. However, as set out herein, the hammer impact force is a function of the width of the firing pulse, or on time, of the hammer. Therefore, the width of this pulse can be varied to vary the flight time of print hammer 10. Thus, in use of this invention it is also necessary to coordinate this flight time information with information concerning carrier velocity and the turn on time, or time of initiation, of the hammer firing. That is, the turn on time and the on time of hammer 10 must be coordinated with the escapement velocity of carrier 1.

The relationship of the turn on time and on time to escapement velocity can be best understood by referring to FIGS. 4 and 5. FIG. 4 illustrates a typical example of the excursion of carrier 1 at the four different velocities, V1, V2, V3, and V4, over a certain distance. In this instance, this distance is approximately $\frac{1}{2}''$. Illustrated in FIG. 5 are pulse widths of the durations of P1, P2, and P3. Before hammer 10 is turned on for one of the three pulse widths to obtain a desired impact force with carrier 1 moving at one of the four different velocities, there must be an appropriate delay. This delay is from initiation of the print hammer cycle until actual firing of the print hammer. The time of initiation of the print hammer cycle corresponds to the hammer sync point. Based on the above, there is a combination of one of the four velocities of carrier 1 and one of the three pulse widths which will cause the impact or print point on paper 12 to always fall at a desired location. In FIG. 5, examples are given of the different delays D1, D2 and D3. These delays must be provided from the time of the hammer sync point to the times FP1, FP2, and FP3 of hammer on or firing in order to provide printing at the time Tp at the print point. Since only one carrier velocity V1 is considered in this example, the various delay times D1, D2 and D3 are dependent upon the width of each of the pulses P1, P2 and P3. As shown, pulse P1 is of the shortest duration, pulse P2 of a duration longer than pulse P1, and pulse P3 of a duration longer than pulses P1 and P2. Each pulse is respectively initiated at the firing times FP1, FP2, and FP3. Each of the pulses respectively terminates the some time Te prior to print point time Tp. The time between Te and Tp represents the free flight of hammer 10. Since pulse P3 drives print hammer 10 the hardest, the flight time of the hammer from time FP3 to Tp is the shortest as is the time from the end of the pulse, Te, to print point time Tp. The flight time of the hammer when actuated by pulse P2 is correspondingly longer than that required for pulse P3. The flight time of the print hammer when actuated by pulse P1 is the longest for the three pulse durations indicated.

The hammer sync point To in FIG. 5 is applicable to only one velocity V1. For the other velocities V2, V3, and V4 considered in the instant application, the location of the sync point relative to Tp will vary.

From the above, selection time is first determined. Based on selection time, carrier 1 is accelerated or decelerated to a printing velocity. A hammer sync point is then determined for beginning the hammer cycle. The hammer sync point is dependent upon the carrier velocity. Based on the carrier velocity and desired impact force, the turn on time of hammer 10 from the sync point is determined. The on time of the hammer is then determined based on the desired impact force.

FIG. 6 illustrates a read only memory (ROM) table which lists output sync points for the first four address locations. The next 12 address locations (5 through 16) list 12 output delay values. Address 17, 18, and 19 list three output hammer impact forces, and 20, 21 and 22 list output selection restart delay times. Each of these values are represented by an 8 bit binary code on the output of the ROM output bus. The inputs for obtaining each of the outputs are listed under the ROM address generation logic column.

Figure 7:
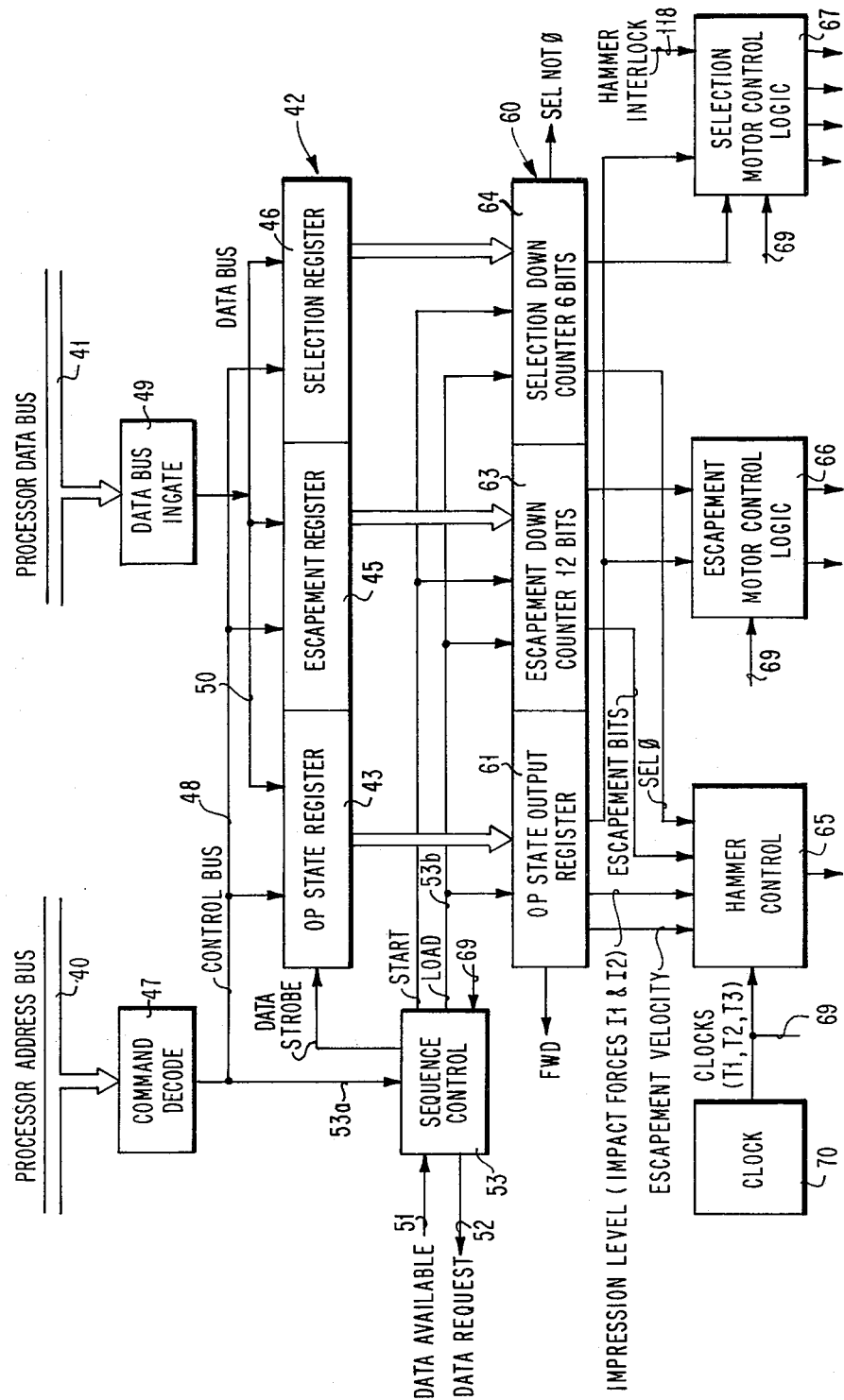
FIG. 7 is a schematic diagram, in block form, of the structure utilized for controlling (a) the operation of motors moving the carrier and the print element, and (b) the print hammer.

Referring now to FIG. 7, a schematic diagram is illustrated of structure which may be utilized in order to provide appropriate control signals to drive escapement motor drive circuit 21, print element drive circuit 22, and hammer drive circuit 23. The data which is to be printed on paper 12 is obtained from a data source (not shown), which may be a conventional data buffer or keyboard input device such as a typewriter. Data from the data source is conducted to the input of a suitable computer or microprocessor. Only the processor output is illustrated in FIG. 7. The processor receives the input data and will make certain calculations and then sends a series of binary numbers out on either an address bus 40 or a data bus 41. In response to the data received from the processor, the circuitry shown in FIG. 7 generates appropriate drive pulses which are applied to circuits 21, 22, and 23. These pulses cause stepper motors 8 and 3 to move carrier 1 and element 2 to desired positions, and control print hammer 10 for printing the data supplied by the data source. The input signals to each of the drive circuits 21 and 22 include information indicating the direction which the stepper motor is to move, and the number of steps to be moved. One pulse is provided by the appropriate drive circuit for each step of the motors 3 and 8.

A plurality of buffer registers indicated generally by the reference numeral 42 receive appropriate information from the processor along address bus 40 and data bus 41. Buffer registers 42 include an operating state register 43 in which is stored carrier velocity and hammer impact force information, an escapement register 45 which receives and stores data concerning the extent of movement of carrier 1, and a selection register 46 which receives and stores data from the processor concerning the selection of the characters on print element 2. In order to load data into the buffer registers 42 from the processor, address data from the processor address bus 40 is input into a command decode 47 and from there through a control bus 48 to the respective buffer registers. Likewise, data from processor data bus 41 is routed through a data bus in gate 49 and then along data bus 50 to the respective inputs of the buffer registers 42. The processor is also connected through control bus 48, data available line 51, and data request line 52 to sequence control 53. Sequence control 53 controls the sequence of operation of the circuitry of FIG. 7 and of the processor. Sequence control 53 is clock controlled by clock 70 along line 69. Since printing is accomplished by the present invention while carrier 1 is in motion, buffer registers 42 provide the necessary buffering in order to have data available on a timely basis for printing and permit the continuous operation of the system. This will be more fully appreciated upon a review of the following paragraphs.

In addition to the buffer registers 42, there are a plurality of operating registers, designated generally by reference numeral 60. Upon receipt of an appropriate load command along line 53b, operating registers 60 receive and store the information contained in the buffer registers 42. This permits buffer registers 42 to then be loaded with new data while the data in operating registers 60 is being acted on. Operating registers 60 include an operating state output register 61 which receives and stores data from operating state register 43, an escapement down counter 63 which receives and stores data from escapement register 45, and a selection down counter 64 which receives and stores data from a selection register 46. The outputs of the respective registers 61, 63 and 64 are interconnected to hammer control 65 for controlling print hammer 10, escapement motor control logic 66 for controlling carrier 1, and selection motor control logic 67 for controlling print element 2.

Operation of the system illustrated in FIG. 7 begins with a control signal applied along line 53a from the processor to sequence control 53. As each series of data from the processor is acted on, sequence control 53 will alert the microprocessor along line 52 that buffer registers 42 are ready to receive new data. A data available response from the processor on line 51 then initiates a control sequence whereby a data strobe signal from sequence control 53 conditions buffer registers 42 for receipt of new data from the processor. Appropriate ones of registers 42 are addressed by the processor through control bus 48 and data to be stored therein is applied through in gate 49 and along data bus 50. Once data is stored in registers 42, sequence control 53 outputs a load control signal on line 53b. This signal is applied to each of the operating registers 60 to cause the data stored in buffer registers 42 to be transferred into the operating registers 60. Thereafter, sequence control 53 outputs a request along line 52 for new data from the processor for storage in buffer registers 42. While the reloading of registers 42 is taking place, the data in operating registers 60 can be acted on.

Figure 8:
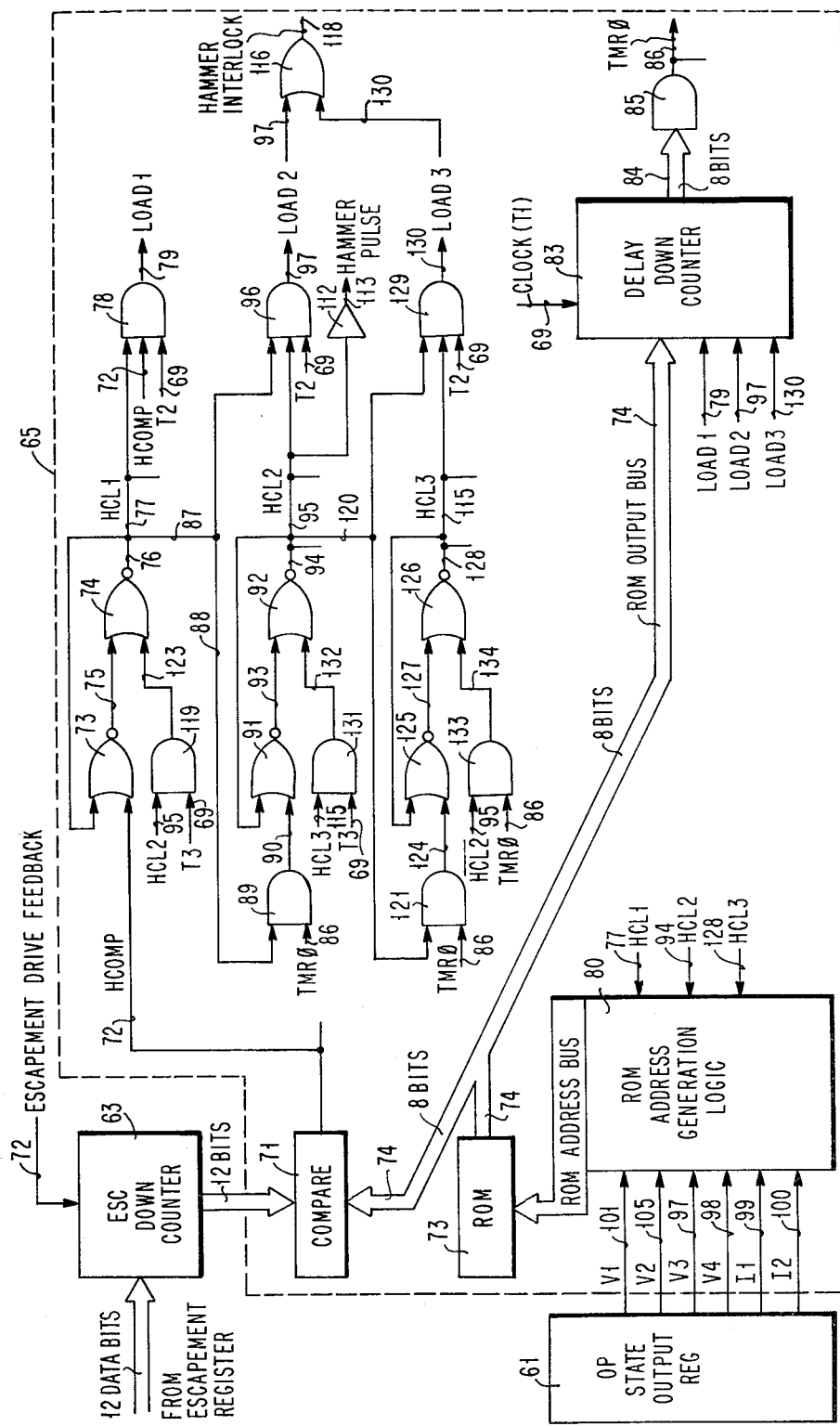
FIG. 8 illustrates the structure included in the hammer control block of FIG. 7.

Refer next to FIG. 8. Illustrated is the structure included in the hammer control block 65 of FIG. 7. Again illustrated in FIG. 8 is escapement down counter 63 in the upper left hand corner. The data stored in counter 63 is applied as a sequence of 12 bits to compare unit 71. Only the lower order 8 of the 12 bits are utilized by compare unit 71. The higher order 4 bits are compared to zero. These 8 bits represent the number of units carrier 1 is located away from escapement zero (print point). Carrier location information represented by these 8 bits is derived from sensor FB1. The output of FB1 is applied along escapement drive feedback line 72 and each unit can be represented by any predetermined number of pulses from sensor FB1.

Operating state output register 61 is again represented in FIG. 8 in the lower left hand corner. Information surrounding a character next to be printed is stored in register 61. The time required for rotating print element 2 for character selection is stored in register 61 as a velocity address code V1 through V4. The code conversion operation of converting character selection time to a velocity address can be performed by the processor prior to the loading of register 61. The velocity address code makes up a portion of a character information byte stored in register 61. The remainder of the character information byte stored in register 61 is an impact code I1 I2 representing the desired impact force. The code conversion operation of converting three impact forces to a two bit impact code can also be performed by the processor prior to the loading of register 61. The impact code I1 I2 is derived according to the following rules. A low impact force is encoded as I1 $\overline{I2}$. A medium impact force is encoded as $\overline{I1}$ I2, and a high impact force is encoded as I1 I2.

The particular one of velocities V1 through V4 that carrier 1 is to be escaped dependent upon the character selection time is then applied to read only memory address generation logic 80. A ROM address is generated in read only memory address generation logic 80 and applied to read only memory (ROM) 73. The output of ROM 73 is then along the ROM output bus 74 to delay down counter 83 and compare unit 71. The output along bus 74 is the number of escapement units away from the print point on paper 12 when the hammer cycle is to be initiated. The time of initiation of the hammer cycle is the hammer sync point. As alluded to above, only the lower order 8 bits from counter 63 are compared in compare unit 71 with the 8 bit output from ROM 73. The higher order 4 bits from counter 63 are checked for all zero's.

When there is a comparison between the count in counter 63 which represents the position of the carrier, and the count in ROM 73 which represents the distance from the print point to the location where hammer sync should occur, an output is applied along line 72 from compare unit 71. The hammer compare (HCOMP) output along line 72 is applied to a latch made up of NOR gates 73 and 74. The hammer compare signal along line 72 is for setting the latch. The signal applied along line 72 is first applied to NOR gate 73. The output of NOR gate 73 is then along line 75 to NOR gate 74. The output of NOR gate 74 is a first hammer control (HCL1) signal along lines 76 and 77 to AND gate 78. The other inputs to AND gate 78 are hammer compare (HCOMP) along line 72 and time T2 along line 69 from clock 70 in FIG. 7. The clock pulses are high frequency non-overlapping pulses used to sequence latches. They are shown throughout the drawings as line 69 for simplicity, but are, in reality, three separate signal lines T1, T2, and T3 as shown in FIG. 9b. When all inputs to AND gate 78 are up, a LOAD1 output signal is applied along line 79.

The HCL1 signal along line 77 is applied to ROM address generation logic 80. V1, V2, V3, V4, I1 and I2 outputs of operating state output register 61 along lines 101, 105, and 97-100 are also applied to ROM address generation logic 80. The up or down condition of these inputs in conjunction with the up HCL1 signal will determine the output of the ROM address generation logic 80, and the information to be addressed in ROM 73. The output of ROM 73, is then applied to delay down counter 83.

The output of ROM 73 is applied to delay down counter 83 at LOAD1 time. Counter 83 is decremented by clock time T1. The output of counter 83 is along an 8 bit bus 84 to AND gate 85. The T1 input to delay counter 83 for decrementing counter 83 is applied along line 69 from clock 70 in FIG. 7. When counter 83 has been counted down to zero, a TMRφ output is applied along line 86.

The output of the latch made up of NOR gates 73 and 74 along line 76 is also applied along lines 87 and 88 to AND gate 89. The other input to AND gate 89 is the TMRφ signal applied along line 86. When both inputs to AND gate 89 are up, an output is applied along line 90 to the latch made up of NOR gates 91 and 92. The output along line 90 to NOR gate 91 is for setting the latch. The output of NOR gate 91 is along line 93 to NOR gate 92. Upon the setting of the latch made up of NOR gates 91 and 92, a second hammer control (HCL2) signal is applied along lines 94 and 95 to AND gate 96. The other inputs to AND gate 96 are HCL1 along line 87 and time T2 along line 69. When the inputs to AND gate 96 are up, a LOAD2 output is applied along line 97.

HCL2 is applied along line 94 to ROM address generation logic 80 along with the outputs from operating state register 61. Information is addressed in ROM 73 and loaded into delay down counter 83 at LOAD2 time. The value loaded is the on time for the hammer. Counter 83 is again decremented by T1 along line 69. HCL2 is applied along line 95 to inverter 112. The output of inverter 112 is a hammer pulse along line 113 to hammer drive circuit 23 in FIG. 1 for turning hammer 10 on.

Following the firing of hammer 10 in FIG. 1, rotation of print element 2 for character selection is not to begin until the hammer has rebounded and is out of the plane of the petals of element 2. Otherwise, the petals of print element 2 could be sheared off. The input to OR gate 116 is either the LOAD2 signal along line 97 or a LOAD3 signal along line 130. The output of OR gate 116 is a hammer interlock output along line 118 to selection motor control logic 67 in FIG. 7.

The HCL2 output from NOR gate 92 along line 95 is also applied to AND gate 119, and along line 120 to AND gate 121. The other input to AND gate 119 is time T3 along line 69. The output of AND gate 119 is along line 123 to NOR gate 74 for resetting the latch made up of NOR gates 73 and 74. The other input to AND gate 121 is TMR$\phi$ along line 86 from counter 83 upon the decrementing of counter 83. When the HCL2 and TMR$\phi$ inputs to AND gate 121 are up, an output is applied along line 124 to a latch made up of NOR gates 125 and 126. The output of NOR gate 125 is along line 127 to NOR gate 126. The output of NOR gate 126 is along the HCL3 lines 128 and 115 to AND gate 129. The other inputs to AND gate 129 are the HCL2 output of NOR gate 92 along line 120 and the time T2 along line 69. The output of AND gate 129 is along the LOAD3 line 130.

HCL3 along line 128 is applied to the ROM address generation logic 80 along with the outputs from operating state register 61. Information is addressed in ROM 73 and then loaded into the delay down counter 83 from bus 74 upon the LOAD3 signal applied to the delay down counter along line 130. The value loaded is the amount of time until the next character selection can be initiated. Upon the occurrence of an up HCL3 output from NOR gate 126 along line 115 and a T3 output from clock 70 along line 69 to AND gate 131, the latch made up of NOR gates 91 and 92 is reset. The output of AND gate 131 is along line 132 to NOR gate 92. Upon the resetting of the latch made up of NOR gates 91 and 92, a down output is applied along the HCL2 line 95 to AND gate 133. The other input to AND gate 133 is the timer equals zero along line 86. The output of AND gate 133 is along line 134 to reset the latch made up of NOR gates 125 and 126.

Figure 9A:
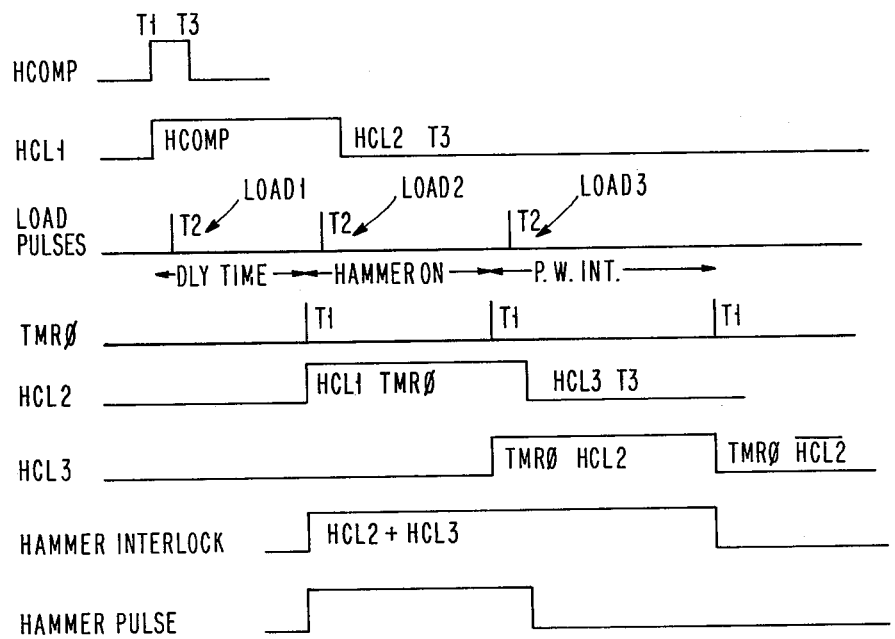
FIGS. 9a and 9b are timing diagrams illustrating the relationship of events which occur for controlling the print hammer.
Figure 9B:
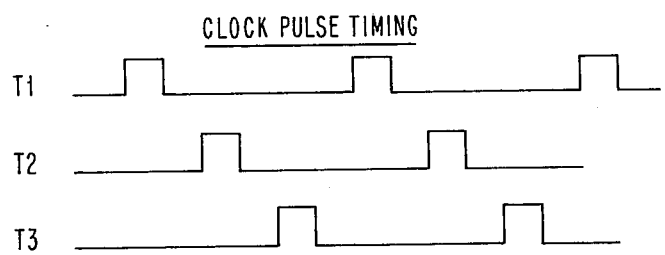

The sequence of events controlled by the structure illustrated in FIG. 8 can be more fully appreciated by referring to FIGS. 9a and b. FIG. 9a illustrates the relationship of the hammer compare signal, HCL1, the LOAD signals, timer equal zero, HCL2 and 3, hammer interlock, and hammer pulse. FIG. 9b illustrates the clock pulse timing relationship of times T1 through T3. These clock pulses are high frequency non-overlapping signals used to sequence the latches referred to above. They are shown throughout the drawings as line 69 for simplicity but are, in reality, three separate signal lines T1, T2 and T3.

The sequence of events controlled by the structure of FIG. 8 will now be summarized. A decision is made as to whether the HCOMP signal along line 72 is up. When HCOMP comes up, the HCL1 latch made up of NOR gates 73 and 74 in FIG. 8 is set. At the time of setting the latch made up of NOR gates 73 and 74, the input to the delay down counter 83 is the output of ROM 73 with delay information. Upon the HCL1 output there will ultimately be a LOAD1 signal along line 79 which gates the output of ROM 73 to delay down counter 83. A TMR$\phi$ signal, along line 86 will set the latch made up of NOR gates 91 and 92. Upon the setting of the HCL2 latch, a LOAD2 signal applied along line 97 loads the output of ROM 73 into the delay down counter 83. This results in counter 83 being loaded with low, medium or high impact information. The HCL1 latch made up of NOR gates 73 and 74 is reset on the T3 clock following the LOAD2 signal. Next, an up output is applied along lines 113 and 118. Thereafter, a decision is made as to whether the delay counter 83 is equal to zero. Upon TMR$\phi$, the hammer driver circuit 23 is turned off. Following this, the HCL3 latch is set. The delay counter 83 is then loaded by a LOAD3 signal applied along line 130 with the time that the hammer will be in contact with the print element (interlock time). The HCL2 latch is reset on the T3 clock following the LOAD3 signal. A decision is again made as to whether TMR$\phi$ is up. Upon TMR$\phi$, the HCL3 latch is reset, and the hammer interlock along line 118 is set to zero.

In summarizing the states of the logic:

$\overline{HCL1}$, $\overline{HCL2}$, $\overline{HCL3}$ represents the idle state wherein a compare output from compare unit 71 has not occurred. HCL1, $\overline{HCL2}$, $\overline{HCL3}$, represents obtaining a delay time and loading delay counter 83. $\overline{HCL1}$, HCL2, $\overline{HCL3}$ represents the time that the hammer driver is on. $\overline{HCL1}$, $\overline{HCL2}$, and HCL3 represents the delay time before the start of the next selection.

In summary, both a method of, and a system for, controlling a constant current print hammer are provided for a carrier type daisy wheel printer. With the carrier escaping and rotation of the print element to be stopped following character selection for printing, the turn on time of the hammer is dependent upon the character selection time and the on time of the hammer will determine impact force for impression control. A logic table is utilized which is selectively and sequentially addressed. That is, selection time is converted to a carrier velocity address code and the output of the table is a sync point for ultimately determining hammer turn on time. The sync point is variable, has no relationship to whether the print element has stopped, and corresponds to the carrier position in escapement units from the print point on a paper to be printed. The velocity address corresponds to the velocity of the carrier at the time a character will be in a position for printing. The table is then again addressed. This time the address is made up of the velocity code and the desired impact force which is converted to an impact code. The output of the table is the actual turn on time for the hammer from the sync point. The on time of the hammer is then determined by the impact code. The impact code is also utilized to determine when selection for the next character can begin.

While the invention has been particularly shown and described with reference to a particular embodiment, it will be understood by those skilled in the art that various changes in form and detail may be made without departing from the spirit and scope of the invention.

What is claimed is:

1. A method of controlling impression in a daisy wheel printer having means for converting required daisy wheel selection times to carrier velocity codes, means for providing an impact force code, and storage means selectively and sequentially addressed by said codes to obtain sync information, print hammer turn on time information related to said sync information, and print hammer on time information, said method comprising:
   (a) addressing said storage means with a velocity code to determine a sync point;
   (b) addressing said storage means with said velocity code and an impact force code to determine a turn on time for said hammer relative to said sync point; and
   (c) addressing said storage means with said velocity code and said impact force code for determining an on time for said hammer.

2. A method according to claim 1 including addressing said storage means with said velocity code and said impact force code to determine an interlock time.

3. A system for controlling print impression in a carrier type daisy wheel printer having a print hammer carried by said carrier and wherein the information available to said system is comprised of carrier velocity information based upon character selection time, impact information based on a desired impact force, and carrier position information, said system comprising:
   (a) a logic table for storing escapement counts for initiation of hammer cycles for characters to be printed, delays to hammer turn on times, hammer on times, and interlock times;
   (b) means for first addressing said table with said carrier velocity information for a character to be printed to obtain an escapement count for initiation of a hammer cycle;
   (c) means for comparing said escapement counts for initiation of hammer cycles based on said carrier velocity information with said carrier position information;
   (d) means upon a comparison of an escapement count for said character to be printed and said position information for establishing a hammer sync point to be used for determining a hammer turn on time;
   (e) means for determining said hammer turn on time based on both said carrier velocity and hammer impact information; and
   (f) means for determining a hammer on time for said character to be printed based on said impact information.

4. A system according to claim 3 including means for next addressing said table with said carrier velocity and hammer impact information to obtain a hammer turn on time for said character to be printed.

5. A system according to claim 4 including means for next addressing said table with said carrier velocity and hammer impact information to obtain a hammer on time for said character to be printed.

6. A system according to claim 5 including means for turning said hammer on at said hammer turn on time.

7. A system according to claim 6 including means for turning said hammer off at the end of said hammer on time.

8. A system according to claim 7 including means for addressing said table for obtaining a delay for delaying selection of a succeeding character to prevent interference between said hammer and a print element carried by said carrier.

* * * * *